US010033763B2

(12) United States Patent
Koneru et al.

(10) Patent No.: US 10,033,763 B2
(45) Date of Patent: Jul. 24, 2018

(54) CENTRALIZED MOBILE APPLICATION MANAGEMENT SYSTEM AND METHODS OF USE

(71) Applicant: KONY, INC., Orlando, FL (US)

(72) Inventors: Raj Kumar Koneru, Windermere, FL (US); Pattabhi Rama Rao Dasari, Hyderabad (IN); Prajakt Deshpande, Hyderabad (IN); Rajendra Komandur, Hyderabad (IN); Sriram Ramanathan, Lutz, FL (US); Matthew Terry, Celebration, FL (US); Matthew Trevathan, Roswell, GA (US); Sathyanarayana Vennapusala, Hyderabad (IN)

(73) Assignee: Kony INC., Orlando, FL (US)

( * ) Notice: Subject to any disclaimer, the term of this patent is extended or adjusted under 35 U.S.C. 154(b) by 454 days.

(21) Appl. No.: 13/886,629

(22) Filed: May 3, 2013

(65) Prior Publication Data

US 2014/0331273 A1 Nov. 6, 2014

(51) Int. Cl.
| | |
|---|---|
| *H04L 29/06* | (2006.01) |
| *G06F 21/41* | (2013.01) |
| *G06F 21/33* | (2013.01) |
| *G06F 21/62* | (2013.01) |
| *G06F 9/00* | (2006.01) |

(52) U.S. Cl.
CPC ............... *H04L 63/20* (2013.01); *G06F 9/00* (2013.01); *G06F 21/335* (2013.01); *G06F 21/41* (2013.01); *G06F 21/629* (2013.01); *H04L 63/0815* (2013.01); *H04L 63/0807* (2013.01)

(58) Field of Classification Search
None
See application file for complete search history.

(56) References Cited

U.S. PATENT DOCUMENTS

| 8,769,651 B2 * | 7/2014 | Grajek et al. ............... 726/8 |
| 2014/0007214 A1 * | 1/2014 | Qureshi et al. ............. 726/12 |
| 2014/0258547 A1 * | 9/2014 | Scavo et al. ............... 709/227 |

* cited by examiner

*Primary Examiner* — Minh Dinh
(74) *Attorney, Agent, or Firm* — Andrew M. Calderon; Roberts Mlotkowski Safran Cole & Calderon, P.C.

(57) ABSTRACT

An application launcher is disclosed for retrieving and permitting launch of multiple mobile applications through a single, secure authentication process, and a method of use. The method includes receiving a request to launch one or more applications through a single authentication process. The method further includes authenticating a user through an application launcher. The method further includes appending a security token to one or more applications upon authentication of the user to enable the user to launch the one or more applications through the single authentication process provided by the application launcher.

30 Claims, 4 Drawing Sheets

CENTRALIZED MOBILE APPLICATION MANAGEMENT SYSTEM AND METHODS OF USE

FIELD OF THE INVENTION

The invention relates to mobile application management systems and methods of use and, more particularly, to an application launcher for retrieving and permitting launch of multiple mobile applications through a single, secure authentication process.

BACKGROUND OF THE INVENTION

The adoption of "smart" phone use in the enterprise has lagged behind the productivity gains seen in the consumer market due in part to concerns on how to securely offer mobile applications to employees. When companies do offer mobile access to corporate systems, it is typically only allowed from a limited set of devices and through a restrictive device configuration ensuring data security. These device restrictions adversely impact the functionality of the device for personal use and have slowed adoption of the mobile device as a prominent productivity tool for the enterprise.

On the other hand, data security can also be provided by restrictive log-on and authentication policies for each application. For example, as mobile devices become more prevalent in the work places as productivity tools, enterprise mobile applications are being used to access various systems similar to existing desktop applications. These enterprise mobile applications may be referred to as applications, and can include a host of different functionalities, depending on the service requirements of the enterprise. As examples, services provided by enterprise mobile applications are typically business-oriented tools such as payment processing, billing systems, enterprise content management, IT management, customer relationship management, enterprise resource planning, business intelligence, project management, collaboration, human resource management, manufacturing applications, enterprise application integration, and enterprise forms automation, etc.

In any of these and other examples, the user is required to log on to each of these applications, separately, through the use of different security mechanisms such as, passwords, authentication protocols, etc., depending on the requirements of the enterprise and level of security required. In some enterprises, for example, these security mechanisms can be different for each application, depending on the level of security required, the personnel having permissions to access such applications and/or a host of other concerns. This makes the log on process cumbersome and very complex, from not only the user's perspective but also from the perspective of the enterprise administrator.

SUMMARY OF THE INVENTION

In a first aspect of the invention, a method comprises receiving a request to launch one or more applications through a single authentication process. The method further comprises authenticating a user through an application launcher. The method further comprises appending a security token to one or more applications upon authentication of the user to enable the user to launch the one or more applications through the single authentication process provided by the application launcher.

In yet another aspect of the invention, a system implementing application launch capabilities of one or more mobile applications on a mobile device comprises a application launcher which appends a security token to one or more mobile applications in order to be launched by a mobile device through a single sign on process.

In still another aspect of the invention, a computer system for sending and receiving policies and mobile applications comprises a CPU, a computer readable memory and a computer readable storage media. First program instructions authenticate a user during a single sign on process by obtaining credentials of the user. Second program instructions retrieve one or more security policies, which are appended to one or more requested applications which the user is authorized to launch. Third program instructions provide application launch capabilities of the requested application, upon authentication of the user, in the single sign on process. The first, second and third program instructions are stored on the computer readable storage media for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention relates to mobile application management systems and methods of use and, more particularly, to an application launcher for retrieving and permitting launch of multiple mobile applications through a single, secure authentication process. More specifically, the present invention shifts the protection and security paradigm of an enterprise system from separate authentication processes at a mobile application level to a single, application launcher for multiple applications. For example, for enterprise applications, e.g., mobile applications, that require enhanced security and are single sign-on enabled, the application launcher of the present invention provides security policies enabling a user to launch any number of authorized mobile applications from a launcher, using a single set of credentials, IDs, and/or other security policies.

In embodiments, the mobile applications can be secured through the application launcher such that they cannot be launched, e.g., opened, directly by the user. To this end, the application launcher requires one or more prerequisite activities before launching multiple mobile applications, e.g., requires the user to enter their enterprise user credentials such as userID, device ID, etc. Once the user credentials are entered, the application launcher can authenticate these credentials by conducting validations and/or retrieval of supporting data. The application launcher, upon authentication of the user, would retrieve a list of applications authorized to be accessible to the user (or icons of the authorized applications), any of which can now be launched from the user's device without the user separately providing credentials to open each application. The user can then select an authorized application, at which time the application launcher would pass a security token identifying the user and any supporting data along with the command to launch the application. Other information can also be passed to the application upon launch such, for example, DeviceID, User Group, etc.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage medium of expression having computer-usable program code embodied in the medium. The computer-usable or computer-readable medium may be any medium that can contain, store, communicate, or transport the program for use by or in connection with an instruction execution system, apparatus, or device. The computer-usable or computer-readable medium may be, for example, an electronic, magnetic, optical, electromagnetic, infrared, or semiconductor system, apparatus, or device.

Figure 1:
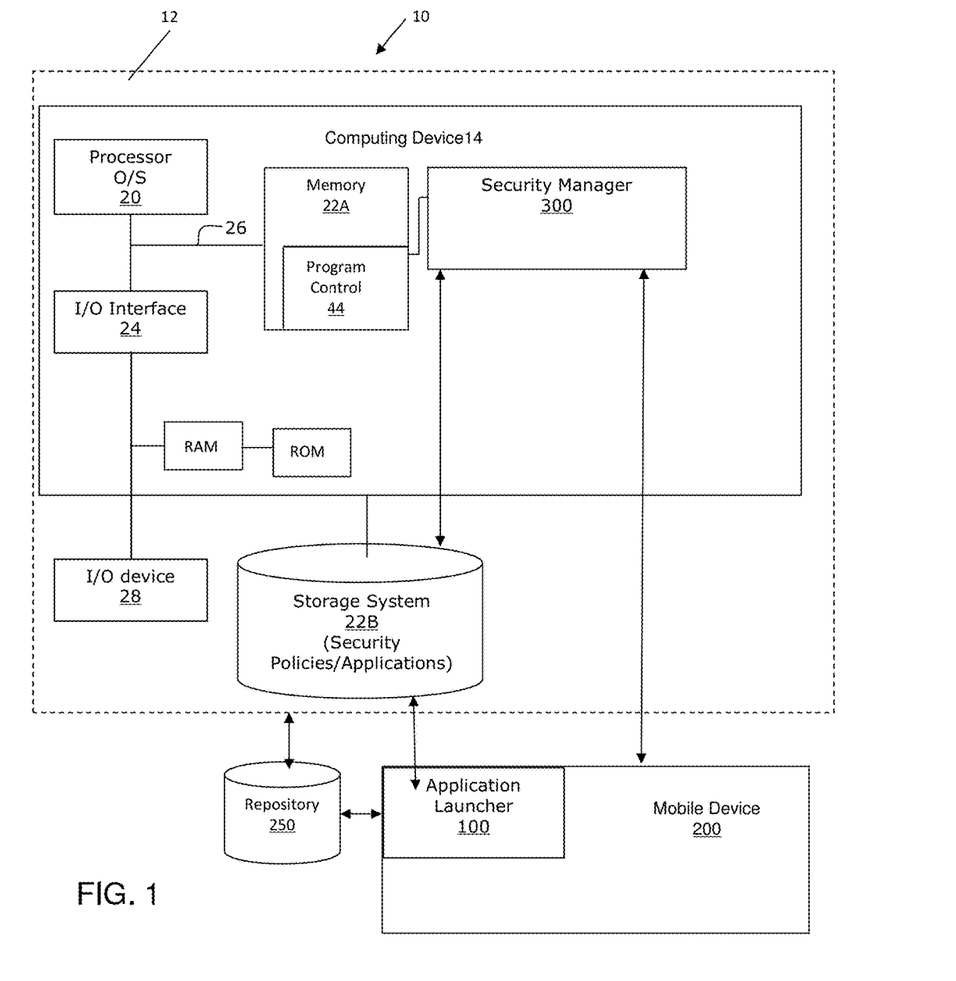
FIG. 1 is an illustrative environment for implementing processes in accordance with aspects of the invention.

FIG. 1 shows an illustrative environment 10 for managing the processes in accordance with the invention. The environment 10 includes a server 12 or other computing device 14. The server 12 can be any server which is implementing or hosting, for example, an application store, on an enterprise system, i.e., a mobile application management server for an enterprise. For example, the server 12 can be a host server for any business enterprise, which stores enterprise mobile applications, e.g., mobile applications, in a storage system 22B, for downloading by an employee or business partner, e.g., consultant, independent contractor, etc. In embodiments, the server 12 can be a standalone server, which implements the processes of the present invention within a networking environment. That is, the server 12 and/or processes performed by the server 12 can be integrated into the networking environment of any enterprise.

The server 12 includes a computing device 14 which can be resident on a network infrastructure or computing device. The computing device 14 includes a processor 20, e.g., CPU, memory 22A, an I/O interface 24, and a bus 26. The bus 26 provides a communications link between each of the components in the computing device 14. In addition, the computing device includes random access memory (RAM), a read-only a memory (ROM), and an operating system (O/S). The computing device 14 is in communication with the external I/O device/resource 28 and a storage system 22B. The I/O device 28 can comprise any device that enables an individual to interact with the computing device 14 (e.g., user interface) or any device that enables the computing device 14 to communicate with one or more other computing devices using any type of communications link. The storage system 22B can store any number of mobile applications, which are independently developed by one or more developers, and which can be maintained, for example, by an enterprise administrator.

The processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code can include computer program instructions which are stored in a computer readable storage medium. The computer program instructions may also be loaded onto a computer, other programmable data processing apparatus, or other devices to cause a series of operational steps to be performed on the computer. Moreover, any methods provided herein in the form of flowcharts, block diagrams or otherwise may be implemented using the computer program instructions, implemented on the computer readable storage medium.

The computer readable storage medium may be, for example an electronic, magnetic, optical, electromagnetic, infrared, and/or semiconductor system. More specific examples (a non-exhaustive list) would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain, or store a program for use by or in connection with an instruction execution system, apparatus, or device of the present invention.

In embodiments, a security manager 300 implements the processes of the present invention, in combination with an application launcher 100 provided on a mobile device 200. The mobile device, much like the computing device, can include a processor, memory, etc., and can be configured as any type of mobile device such as a tablet, smart phone, laptop computer, personal digital assistant, etc.

In embodiments, the security manager 300 can be implemented as one or more program code in the program control 44 stored in memory 22A as separate or combined modules. Additionally, the security manager 300 may be implemented as separate dedicated processors or a single or several processors to provide the function of this tool. Similarly, the application launcher 100 can be implemented on the mobile device 200 as separate dedicated processors or a single or several processors to provide the function of this tool.

In embodiments, the security manager 300 administers security policies on the backend system, e.g., server 12 or computing device 14. In embodiments, the security polices can be saved as security tokens which are between the application launcher 100, the security manager 300 and a database of applications, e.g., storage system 22B. As discussed herein, the security tokens can be saved in a credential vault in the application launcher 100 or on the mobile device 200, and appended or packaged to the applications, granting permission for the user of the mobile device to launch certain authorized applications. In more specific embodiments, the security tokens can be cached in a credential vault of the launcher 100 or on the mobile device 200, and saved permanently in the backend system, e.g., storage system 22B.

In embodiments, the security policies can be saved in the storage system 22B, with a host of enterprise applications that are retrievable by an end user. It should be understood by those of skill in the art that the security policies and the enterprise applications can be stored in the same or different storage systems. For example, the enterprise applications can be retrieved from a remote enterprise repository 250. In any scenario, once retrieved, the applications can reside on the mobile device 200.

The security policies can be used to define which users (of mobile devices) can have access to certain authorized applications, using a single sign-on process. In embodiments, the security policies can be configured to take into account the application ID, device platform, specific DeviceID, specific userID, device characteristics and/or the user's group information.

These security policies can be provided by the security manager 300 or developer of the application, and cached by the application launcher 100 for appending to applications (as security tokens) which are authorized to be used by a user. The security policies can be permanently stored by the security manager 300 in a repository, e.g., storage system 22B. In this way, certain levels of security or enforcement policies can be matched to different applications based on the user, e.g., level of security, types of applications, types of mobile devices, etc. These policies can be viewed and changed, for example, through the application launcher 100, including whether such applications should be public, private, protected, etc.

Illustratively, the security policies are defined by a set of restrictions, e.g., which applications can be launched by authorized users. These policies are assigned to instantiations of the application, and can be automatically applied by the application launcher 100, without user input; although, a user may have access to view and, in embodiments, change certain security policies, with permission provided by, for example, the security manager 300. In embodiments, the security policies can be implemented as security tokens appended to the applications and stored (cached) in the application launcher 100. As should be understood by those of skill in the art, the security token can be, for example, a hardware token, authentication token, or cryptographic token that an authorized user of computer services is given to ease authentication. For example, security tokens are used to prove one's identity electronically. The security token can be used in addition to or in place of a password. The security token can be passed between the security manager 300, the database 22B and the launcher application 100.

The security policies include, in no particular order and amongst other examples:
  i. Block access to certain applications;
  ii. Block the ability to view, store and/or change credentials or other data;
  iii. Allow the user to view, store and/or change credentials or other data through the application launcher 100;
  iv. Allow the user to launch an application with a single sign-on token, e.g., without accessing through the application launcher 100;
  v. Enforce application closure after a specific idle time has elapsed;
  vi. Require applications to be launched on a secure connection such as using Secure Sockets Layer (SSL);
  vii. Require updates to applications;
  viii. Disable application after an expiration time; and/or
  ix. Allow application usage only during a specific date or time span (e.g., business hours).

The security policies can be an Extensible Markup Language (XML) file or other type of file that contains the restrictions and supporting attributes, where each policy file is managed by the security manager 300 and cached, as appropriate, by the application launcher 100. As should be understood by those of skill in the art, XML files are a markup language that defines a set of rules for encoding documents in a format that is both human and machine readable. The XML language can include, for example, Really Simple Syndication (RSS), Atom, Simple Object Access Protocol (SOAP), and XHTML, amongst others.

In implementations of the present invention, the application launcher 100 serves as a security gateway to access multiple enterprise applications, e.g., applications, stored in one or more storage systems, represented generally at reference numeral 22B, resident on the mobile device 200, itself, or other repository 250. For example, the application launcher 100 enables the user, e.g., mobile device 200, to launch multiple applications through a single sign-on and authentication process. That is, once authentication is successfully provided through the application launcher 100, e.g., validation of user credentials are completed, the application launcher 100 can retrieve any authorized application for a particular authorized user for subsequent launch by the user through a single interface. In embodiments, the application launcher 100 can provide a list of authorized applications, or separate icons which are capable of being opened directly from the mobile device 200.

In more specific embodiments, the application launcher 100 can be resident on one or more mobile devices, as represented at reference numeral 200. In contemplated embodiments, the application launcher 100 can also be provided on a central service, e.g., server 12, in order to be accessed by many different mobile devices. In addition, the application launcher 100 can integrate with the storage system 22B or other repository 250 in order to access, retrieve and provide launch authority for any of the applications stored in the storage system 22B or other repository 250. These features can be provided through a single sign-on and authentication process accomplished through use of the application launcher 100; compared to conventional systems which require separate sign-on tokens and authentication processes at the application level for each and every application. In this way, the user need only be authenticated once for multiple applications through a single sign in process, based on security policies which are administered at the central application launcher level.

In embodiments, after completion of the required authentication processes by the application launcher 100, a security token can be passed directly to the application for launch by the user. That is, once a user is authorized, a security token can be appended to an application in order for the authorized user to launch the application. More specifically, the user can then select an authorized application, and the application launcher would pass a security token identifying the user and any supporting data along with the command to launch the application. In further embodiments, the security token can be passed from one authorized application to another authorized application, or passed through the application launcher 100, depending on the particular configuration of the system. To this end, the single sign-on and authentication processes can be used for multiple applications, launched through the application launcher 100.

As to any of the above scenarios, the application launcher 100 can serve as a credential vault where multiple security tokens could be returned from the backend authentication and authorization systems, e.g., server 12. These multiple security tokens can be cached in the application launcher 100, for appending to any authorized application for launch by the authorized user. In implementations, the backend systems, e.g., server, can also permanently store the credentials of the users, e.g., security policies, IDs, etc., which can also be returned to the application launcher 100. In further implementations, the user could add additional security information to the application launcher 100, to store in its credential vault. As with any of the stored credentials, they can be passed to the application at application launch and could be used to facilitate non-standard single sign-on processes in the application.

Additionally, the present invention contemplates providing the user with single launch capabilities, apart from the application launcher 100. For example, if an application were launched directly outside of the application launcher, the security policy of the launched application would specify the requirement of a security token from the application launcher 100. If a security token is not provided, for example, the application would display an error message and close once the message is acknowledged, as an example.

Figure 2:
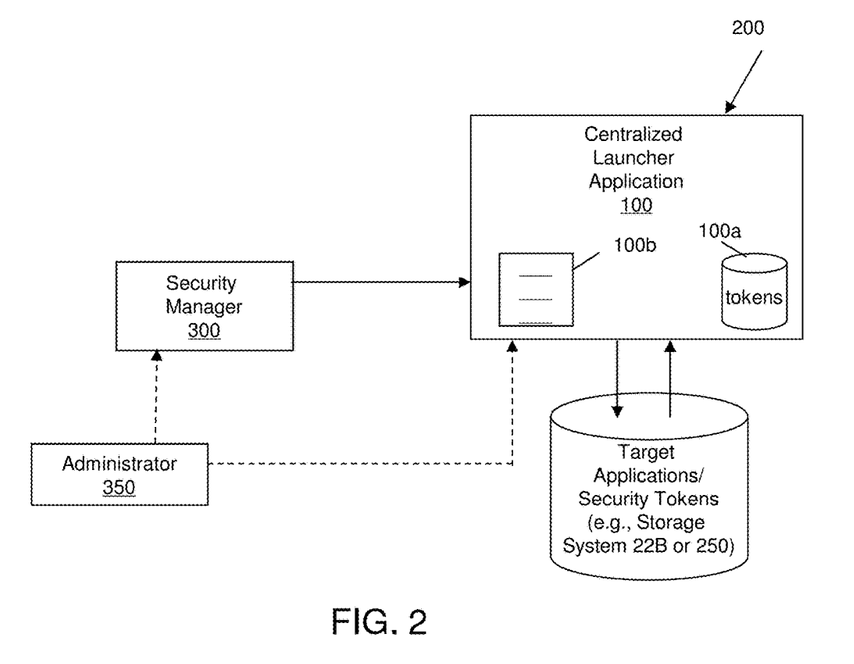
FIG. 2 shows a logical architecture overview of a system in accordance with aspects of the invention.

FIG. 2 shows a logical architecture overview of the system in accordance with aspects of the present invention. Specifically, FIG. 2 shows further details of the launcher application 100 residing in a mobile device 200, and communicating with a security manager 300 and a storage system 22B or 250, which hold a plurality of applications and security tokens.

In embodiments, a developer can independently develop enterprise applications, without knowledge of the security policies. This allows the developer more flexibility in creating the enterprise applications, without having to consider or be encumbered by the security policies, which will be later developed and appended to the applications by either the security manager 300 or the application launcher 100, depending on the configuration of the present system. In embodiments, the developer can also provide default policies, which can be overridden or modified, in some manner, by the security manager 300 (and more specifically, an administrator 350 of the enterprise). For example, the default policy may be to allow public access or limited access to a particular application. The developer can be a third party developer, or an employee of the enterprise. In any scenario, though, the developer can be free to develop any desired application.

In embodiments, the applications can be saved in the application repository, e.g., storage system 22B or 250. These applications can include, for example, any enterprise application as already described herein, or other suitable applications which may include applications requiring data entry. In additional or alternative embodiments, each application can support direct application launch, or be launched directly from the application launcher 100. For example, each application can be instrumented with a security framework that runs at the application launcher 100 to execute security polices including the option to require the application to be launched only from the application launcher 100, as described herein.

If, though, an application is not launched from the application launcher 100 and such action is permitted by the security policy, then a single sign-on token would not be available and the user would be required to provide the necessary security credentials as required to launch a particular application, at the application level. This single sign-on token would not be passed through the application launcher 100 and, hence, the user would not be permitted to launch other applications through a single authentication process. Also, by not using a single sign-on token, any updates provided by the user, e.g., credentials, etc., would not be automatically saved by the application launcher 100; although, an option can be provided that allows the user to request updates be saved to or by the application launcher 100, during a log-off process.

In further embodiments, when the application is closed, the application can send a message to the application launcher 100, so that the application launcher application can immediately relaunch itself. Also, the present invention contemplates a synchronization process, in which data entered via the application can be saved and synced with other open applications on different mobile devices. For example, a developer or the administrator 350 can predetermine, through security policies, which changes are public, private, protected for some changes in the application. This can be done by use of naming designations such as, for example, com.kony.finance.*, which indicates that users designated as "financial" persons can have access and save certain data within the application.

An enterprise administrator 350 or other authorized user can create, configure and/or update security policies (rules) and upload them to a security manager 300, or directly to the launcher application 100. The security policies, in turn, are passed to the application launcher 100, directly or via the security manager 300 as, e.g., security tokens. These security tokens can be passed between the launcher application 100 and the security manager 300, and can be cached in the application launcher 100 for launching of applications directly from the mobile device 200.

As described already, the security policies can be an XML file or other type of file, and will include restrictions to be enforced by the launcher application 100. Alternatively or in addition, the security manager 300 can provide other access information, e.g., userID, password or other authentication mechanisms, to the application launcher 100, such that the application launcher 100 can determine which applications to retrieve from the enterprise user repository, e.g., storage system 22B, for launch by certain authorized users.

In embodiments, the security tokens 100a can be stored in the application launcher 100, any of which are associated with a list of applications 100b. In implementations of the present invention, the list of applications 100b correspond to applications, e.g., mobile enterprise applications, stored in the application repository, e.g., storage system 22B or 250. These lists 100b can be provided to the user upon authentication.

Upon login by the user, the application launcher 100 will receive user information and authorization roles from the user. The application launcher 100 will send this information to the security manager 300, e.g., backend system, in order to obtain security policies for the user, which is passed as security tokens back to the application launcher 100. Alternatively, the security policies may already be resident on the application launcher 100. In either scenario, the security policies will indicate which applications the user has access to launch.

The application launcher 100 will analyze the security policies of the user and retrieve an appropriate security token. The application launcher 100 will also retrieve the appropriately authorized applications from the storage system 22B, and append the security token thereto. In embodiments, embodiments, the applications may already be provided on the mobile device, or at least icons of the applications in which the user now is authorized to launch. The security tokens can be appended to a single application for initial launch, multiple applications or any combination thereof.

The application launcher 100 can provide a list of authorized applications to the user such as, for example, by providing icons which can be opened by the user. The user can then open the icons, at which time the application can be launched based on the information in the security tokens. The security token can be passed between multiple applications, which are authorized to be launched by the user, or passed through the application launcher 100. Once the application is launched, the application launcher 100 can go hibernate, e.g., sleep, until another token or login process is required.

The security manager 300 could track usage and other information such as, for example, pending updates or enforcement of rules. As to enforcement, the security manager 300 can provide an escalation path to apply increasing pressure to accept updates. For example, the security manager 300 can request the application launcher 100 to present a notification to the user. After a set time period or number of notifications, the security manager 300 could enforce an ever increasing wait time to launch other enterprise applications if the user does not accept the required update. The updated policy may be obtained through either a pull or push operation.

In embodiments, the security manager 300 can also implement default policies which are initially packaged with any of the mobile applications by the launcher application 100. These default policies can be stored in cache or other local storage system by the launcher application 100. These default policies can act as a security layer between the application and the mobile device. For example, a default policy (or most recently updated policy) can specify that each time the mobile application is requested by the user, the application launcher 100 will check for updated policies, via the security manager 300, for example.

Figure 3:
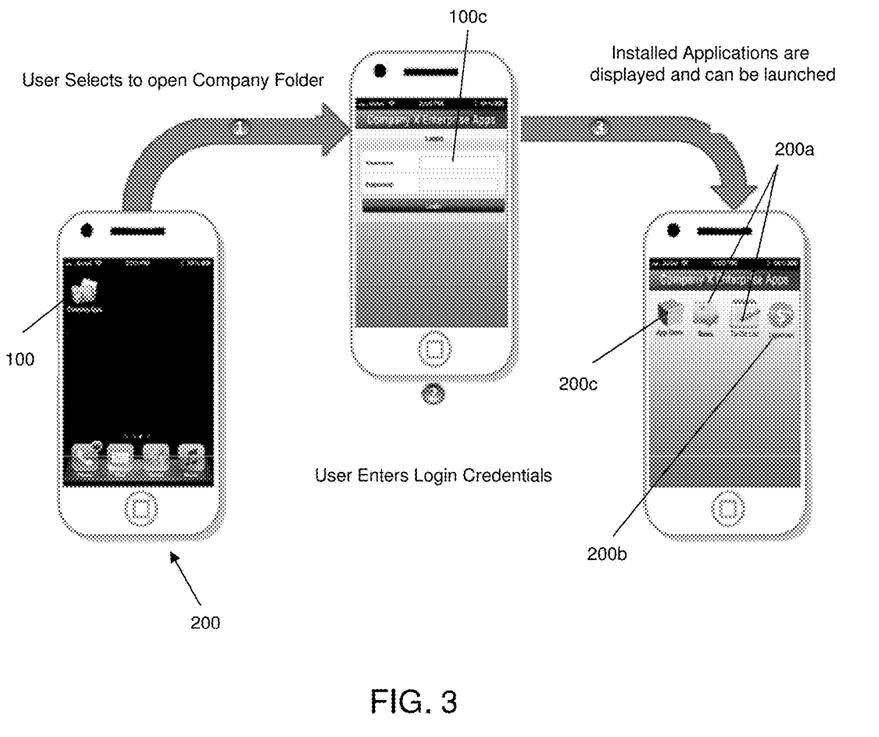
FIG. 3 shows an implementation within a mobile device in accordance with aspects of the invention.

FIG. 3 shows an implementation of the processes of the present invention within a mobile device. As shown in FIG. 3, the mobile device 200 includes a company folder, e.g., application launcher 100. The user can select this application launcher 100 (at step 1), at which time a single window can be opened on the user's mobile device 200. The user will then be requested to enter identification information, for authentication shown at reference numeral 100c (step 2). This identification information can be, for example, userID and password information, although other information is also contemplated by the present invention.

The application launcher 100 will authenticate this information, append a security token to the application(s) authorized to be launched by the user, and present the authorized application(s) to the user (step 3). In step 3, for example, the application launcher 100 can present an icon 200a for each application installed on the user's device, which the user can now access by virtue of the single sign on process at step 2. Also, the application launcher 100 can display an icon for applications that are available to the user, but not yet installed (based on the user's authorization, group, role, etc.), as shown at reference numeral 200b. The user can select the icon 200b, in which case, the application launcher 100 would link the user to the application associated with the icon 200b.

By way of one example, a security token can be passed from an application associated with the icon 200a to an application associated with the icon 200b. Alternatively, a new token can be provided by the application launcher 100. In either case, the user will be authenticated only once, during a single sign-on, yet gain access to one or more applications for launch. The application launcher 100 can also present an application store icon 200c, for applications that may also be accessible by the user.

The application launcher 100 can also verify the integrity of the mobile device 200 before allowing the launch of any of the applications. This may include checking the device for jailbreaking or rooting. As should be understood by those of skill in the art, the term "jailbreak" defines the action of gaining access to a proprietary private file system to override some of the device's restrictions. Jailbreaking also enables a user to install third-party applications on unauthorized devices. Similarly, rooting refers to a device hack that provides users with unrestricted access to the entire file system of their mobile devices. This may also include checking the digital signatures or other integrity checks of the enterprise application binaries, for example. In embodiments, the user could also add additional security information to the application launcher 100, to store in its credential vault. These values would be passed to the application at application launch and could be used to facilitate non-standard single sign-on processes in the application.

Flow Diagram

Figure 4:
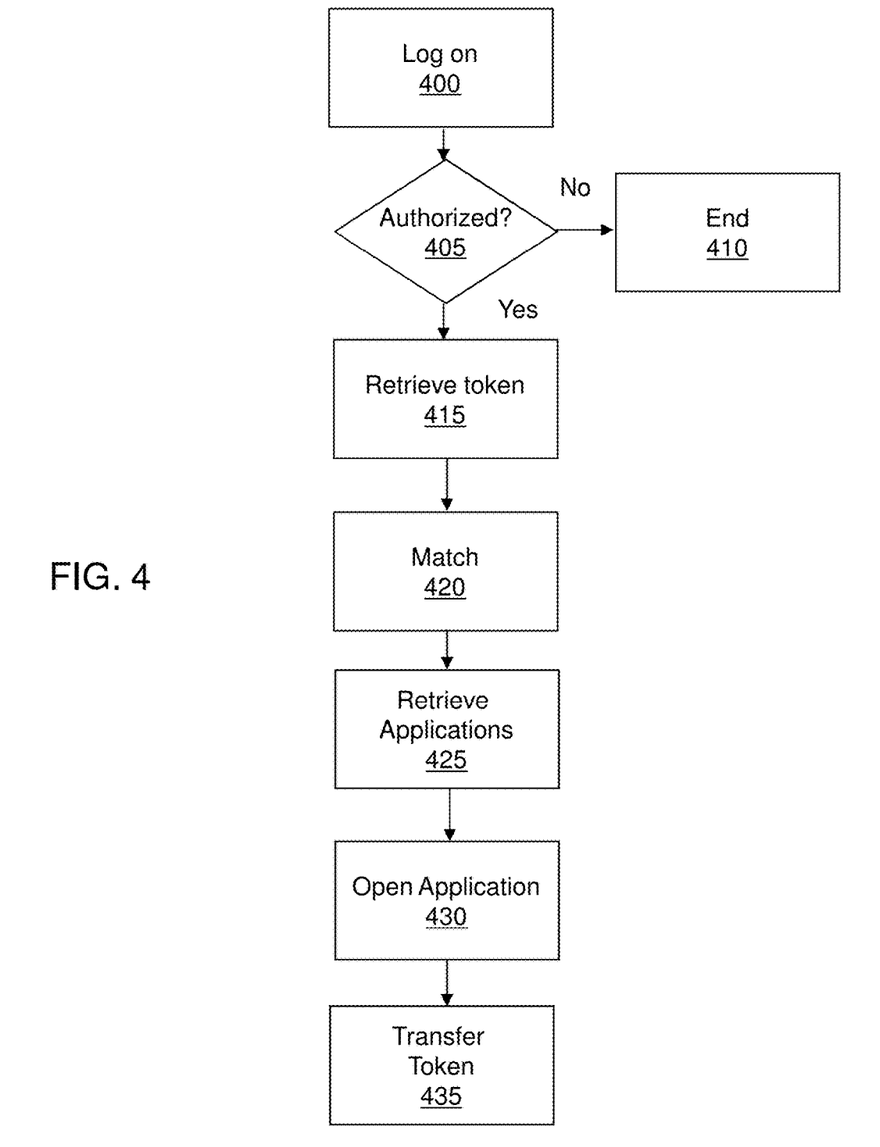
FIG. 4 shows a flow diagram implementing processes in accordance with aspects of the invention.

FIG. 4 shows a flow diagram implementing aspects of the present invention. The flow diagram may equally represent a high-level block diagram or a swim-lane diagram of the invention. The steps of the flow diagram may be implemented and executed from either a server, in a client server relationship, or they may run on a user workstation with operative information conveyed to the user workstation. Furthermore, the invention can take the form of a computer program product accessible from a computer-readable storage medium providing program code for use by or in connection with a computer or any instruction execution system. The software and/or computer program product can be implemented in the environment of FIGS. 1-3.

In FIG. 4, at step 400, a user logs on the application launcher. The login information may include user credentials such as password and userID, amongst other items, e.g., a request for one or more applications. At step 405, the application launcher will determine whether the user is authorized to receive the requested applications. This can be performed through an authentication process, e.g., by cross referencing credential information stored in a credential vault with that supplied by the user at log in. If the application launcher determines that the user is not authorized to open applications, the process ends at step 410.

If the application launcher finds a match, e.g., determines that the user is authorized to open one or more applications, at step 415 the application launcher will retrieve a security token from its storage system or from a security manager. At step 420, the application launcher will match the security tokens to its list of applications to determine which applications are available in the application storage system. At step 425, the application launcher will retrieve the application and append the security token thereto. In alternative embodiments, at step 425, the application launcher can provide a list of authorized applications to the user, via icons. The user can then select any of the icons, at step 430, at which time the application launcher will launch the application, for use on the user's device.

At step 435, the user can select to launch another application through the application launcher. This may be an application already provided to the user, via an icon. During this process, the security token can be passed directly to the newly selected application by the previously launched application, or directly from the application launcher. By passing the security token to the newly selected application, the user can then launch the newly selected application without the need for a separate login and authentication process.

Thus, using a single sign on process, the application launcher can receive user information and authorization roles from the user, e.g., through the mobile device. The authorization roles can include, for example, a list of applications the user can launch, based on business rules executed by a backend system, e.g., as provided by the enterprise application administrator. The business rules, in turn, provide authorization to access applications based on user need, security level, or other enterprise criteria. The application launcher can then use this information to authenticate the user, at start, by integrating, for example, with the enterprise user repository, e.g., storage system. Once integrated, the application launcher can retrieve and provide authorized applications to the user, which can then be launched from the mobile device.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:

1. A method comprising:
   receiving a request to launch one or more applications through a single authentication process;
   authenticating a user through an application launcher to authorize the one or more applications;
   appending a security token to at least one authorized application of the one or more applications, via the application launcher, upon authentication of the user to enable the user to launch the one or more applications through the single authentication process provided by the application launcher; and
   appending the security token to another authorized application, via the application launcher, which enables the user to launch the one authorized application and the another authorized application without requiring additional authentication of the user.

2. The method of claim 1, wherein the authenticating includes checking credentials provided by the user.

3. The method of claim 2, wherein the checking of the credentials is performed by the application launcher.

4. The method of claim 1, wherein the security token is retrieved from a cache of the application launcher.

5. The method of claim 1, wherein the security token is retrieved from a security manager, remote from the application launcher.

6. The method of claim 1, wherein the application launcher serves as a security gateway on a mobile device to access multiple enterprise applications by appending the security token to the one or more applications upon authentication of the user.

7. The method of claim 6, further comprising integrating the application launcher with a storage system in order to access, retrieve and provide launch authority for any of the one or more applications.

8. The method of claim 1, further comprising providing a list of authorized applications or separate icons to the user, after the user has been authenticated, which are capable of being opened directly from a mobile device upon authenticating the user through a single sign-on and authentication process during the launch thereof.

9. The method of claim 8, wherein the list of authorized applications or separate icons the user can launch is based on business rules executed by a backend system.

10. The method of claim 9, wherein the business rules provide authorization to access application based on at least one of user need, security level and other enterprise criteria.

11. The method of claim 1, wherein the security token provides security restrictions associated with the one or more applications.

12. The method of claim 1, further comprising updating security policies of the security token.

13. The method of claim 1, further comprising providing the user with single launch capabilities, apart from the application launcher.

14. The method of claim 1, further comprising checking an integrity of a mobile device, prior to launching the one or more applications.

15. The method of claim 1, wherein the steps of claim 1 are implemented in a computer infrastructure having computer executable code tangibly embodied on a non-transitory computer readable storage medium having programming instructions operable to perform the steps of claim 1.

16. A system implementing application launch capabilities of one or more mobile applications on a mobile device, comprising a computing system with a processor executing computer instructions implementing functionality and capabilities of an application launcher tool, wherein the application launcher tool appends a security token to one authorized application of the one or more mobile applications to be launched by a mobile device through a single sign on process, and the application launcher tool also appends the security token to another authorized application of the one or more mobile applications to enable a user to launch the one authorized application and the another authorized application without requiring additional authentication of the user.

17. The system of claim 16, wherein the application launcher tool stores the security token as security policies for the one or more mobile applications.

18. The system of claim 17, wherein the security policies are an Extensible Markup Language (XML) file that contains restrictions and supporting attributes, and which is managed by the application launcher tool.

19. The system of claim 16, wherein the application launcher tool receives credentials from a user and authenticates the user, prior to appending the security token.

20. The system of claim 16, wherein the one or more mobile applications are launched directly from the application launcher tool through the single sign on process.

21. The system of claim 16, wherein the application launcher tool is a computer infrastructure having computer executable code tangibly embodied on a computer readable storage medium having programming instructions.

22. The system of claim 16, wherein updates to user credentials or security policies are automatically saved by the application launcher tool.

23. The system of claim 16, wherein the application launcher tool goes to sleep, upon launching of the one or more applications by the mobile device.

24. The system of claim 16, further comprising a security component that at least one of:
   tracks usage information and updates enforcement of rules;
   provides an escalation path to apply increasing pressure to accept the updates;

requests the application launcher tool to present a notification to the user; and after a set time period or number of notifications enforces an increasing wait time to launch other enterprise applications when the user does not accept the update.

25. The system of claim 16, wherein the application launcher tool provides a list of authorized applications or separate icons to the user, after the user has been authenticated, which are capable of being opened directly from a mobile device upon authenticating the user through a single sign-on and authentication process during the launch thereof.

26. A computer system for sending and receiving policies and mobile applications, the system comprising:

a CPU, a computer readable memory and a computer readable storage media;

first program instructions to authenticate a user during a single sign on process by obtaining credentials of the user;

second program instructions to retrieve one or more security policies, which are appended, using an application launcher, to an authorized application of the one or more requested applications which the user is authorized to launch;

third program instructions to provide application launch capabilities of a requested application, upon authentication of the user, in the single sign on process and fourth program instructions to append the one or more security policies, using the application launcher, to another authorized application which enables the user to launch the one authorized application and the another authorized application without requiring additional authentication of the user; and wherein the first, second, third and fourth program instructions are stored on the computer readable storage media for execution by the CPU via the computer readable memory.

27. The computer system of claim 26, wherein the one or more requested applications are launched directly from the computer system through the single sign on process.

28. The computer system of claim 26, further comprising further comprising program instructions to provide a list of authorized applications or separate icons to the user, after the user has been authenticated, which are capable of being opened directly from a mobile device upon authenticating the user through a single sign-on and authentication process during the launch thereof.

29. The computer system of claim 26, further comprising program instructions to provide a list of authorized applications or separate icons to the user, after the user has been authenticated, which are capable of being opened directly from a mobile device upon authenticating the user through a single sign-on and authentication process during the launch thereof.

30. The computer system of claim 29, wherein the list of authorized applications or separate icons the user can launch is based on business rules executed by a backend system, and the business rules provide authorization to access application based on at least one of user need, security level and other enterprise criteria.

* * * * *